(12) United States Patent  (10) Patent No.: US 7,974,020 B2
Zou  (45) Date of Patent: Jul. 5, 2011

(54) LENS AND PROCESS FOR THE PRODUCTION THEREOF

(75) Inventor: Xuelu Zou, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 542 days.

(21) Appl. No.: 11/902,957

(22) Filed: Sep. 26, 2007

(65) Prior Publication Data

US 2008/0084613 A1   Apr. 10, 2008

(30) Foreign Application Priority Data

Sep. 28, 2006   (JP) ................. 2006-264702

(51) Int. Cl.
*G02B 7/02* (2006.01)
(52) U.S. Cl. ...................................... 359/811
(58) Field of Classification Search ............ 359/811, 359/819; 353/100; 396/529; 362/455; 65/102, 65/66
See application file for complete search history.

(56) References Cited

U.S. PATENT DOCUMENTS

| | | | | |
|---|---|---|---|---|
| 4,433,062 A | * | 2/1984 | Courbin et al. | 501/44 |
| 4,929,265 A | * | 5/1990 | Carpenter et al. | 65/64 |
| 5,274,502 A | | 12/1993 | Demerritt et al. | |
| 7,611,648 B2 | * | 11/2009 | Wolfing et al. | 264/2.4 |
| 2005/0249919 A1 | | 11/2005 | Wolfing et al. | |

FOREIGN PATENT DOCUMENTS

| | | |
|---|---|---|
| JP | 1-183611 | 7/1989 |
| JP | 5-215949 | 8/1993 |
| JP | H06-191876 A | 7/1994 |
| JP | 2002-55201 | 2/2002 |
| JP | 2005-353718 | 12/2005 |

* cited by examiner

*Primary Examiner* — Joseph Martinez
(74) *Attorney, Agent, or Firm* — Nixon & Vanderhye P.C.

(57) ABSTRACT

A lens formed of a fluorophosphate glass, which has an optical-function surface and has a positioning reference surface for positioning and fixing the lens in the fixing tool (and also for determining the direction in the direction of the optical axis), so that the above optical-function surface is not damaged, both the optical-function surface and the positioning reference surface being transfer surfaces formed by the transfer of form of a molding surface of a mold according to precision press-molding.

7 Claims, 1 Drawing Sheet

Fig. 1

LENS AND PROCESS FOR THE PRODUCTION THEREOF

This application claims priority to JP 2006-264702 filed Sep. 28, 2006, the entire contents of which is hereby incorporated by reference.

TECHNICAL FIELD

This invention relates to a lens formed of a fluorophosphate glass and a process for the production thereof. More specifically, it relates to a lens formed of a fluorophosphate glass, which is formed by the transfer of form of the molding surface of a press mold according to precision press molding and which has an optical-function surface and a positioning reference surface, and a process for efficiently producing such lenses by the precision press molding of preforms.

TECHNICAL BACKGROUND

A low-dispersion glass is used for lenses that constitute an optical system for correcting the chromatic aberration, and the like. A typical low-dispersion glass is a fluorophosphate glass as described in JP-A-6-191876.

A lens formed of a fluorophosphate glass has a high utility value as described above, while a more space-saving optical system can be realized when the optical-function surface of the lens is aspherical. The precision press molding method is suitable for producing such an aspherical lens.

The precision press molding method enables the mass-production of not only aspherical lenses but also lenses that are difficult to produce by a polishing method in which the optical-function surface is completed by polishing.

Meanwhile, when a lens is produced by the precision press molding method, there is employed a method in which the external form and optical-function surface of the lens are formed by the precision press molding and the circumferential portion of the optical-function surface is cut or ground to complete the lens. The above cutting or grinding of the circumferential portion is called a centering and edging process, in which the lens is completed to ensure that a portion called a round edge is in parallel with the optical axis.

When the centering and edging process is carried out, the round edge is cut or ground while the optical-function surface is held with a fixing tool. In this case, however, a precision-press moldable fluorophosphate glass has a problem that the optical surface thereof is easily scratched during the above centering and edging process since the hardness of the glass is low.

DISCLOSURE OF THE INVENTION

Problems to be Solved by the Invention

It is an object of the present invention to provide a lens formed of a fluorophosphate glass, which overcomes the above prior art problem and which has an optical-function surface and has a positioning reference surface for positioning and fixing the lens in the fixing tool so that the above optical-function surface is not damaged.

Means to Solve the Problems

For achieving the above object, the present inventors have made diligent studies. As a result, it has been found that a lens having an optical-function surface and a positioning reference surface which are both transfer surfaces formed by transferring a form of the molding surface of a mold according to precision press-molding is suitable for the above object, and it has been found that the above lens can be produced by heating a preform formed of a fluorophosphate glass to soften it and precision press-molding the preform with a mold. The present invention has been accordingly completed on the basis of the finding.

That is, the present invention provides;

(1) a lens formed of a fluorophosphate glass, which has an optical-function surface and a positioning reference surface for positioning and fixing the lens in a fixing tool and also for determining the direction in the direction of the optical axis, both the optical-function surface and the positioning reference surface being transfer surfaces formed by the transfer of form of a molding surface of a mold according to precision press-molding, (2) A lens as recited in the above (1), whose entire surfaces are formed of transfer surfaces formed by the transfer of form of the molding surface of the mold according to precision press-molding or formed of said transfer surfaces and a free surface or free surfaces, (3) a lens as recited in the above (1) or (2), wherein the fluorophosphate glass contains at least 1 cationic % of $Li^+$ as a cationic component, (4) a lens as recited in any one of the above (1) to (3), wherein the fluorophosphate glass has a glass transition temperature of 500° C. or lower, (5) a process for the production of a lens formed of a fluorophosphate glass, which comprises heating a preform of said glass to soften it and precision press-molding the preform with a mold, wherein forms of the molding surface of said mold are transferred to form an optical-function surface and a positioning reference surface for positioning and fixing the lens in a fixing tool, (6) a process for the production of a lens as recited in the above (5), wherein the fluorophosphate glass contains at least 1 cationic % of $Li^+$ as a cationic component, (7) a process for the production of a lens as recited in the above (5) or (6), wherein the fluorophosphate glass has a glass transition temperature of 500° C. or lower, and (8) a process for the production of a lens as recited in any one of the above (5) to (7), which uses the preform whose entire surface is a surface formed by solidification of a glass surface in a molten state.

Effect of the Invention

According to the present invention, there can be provided a lens formed of a fluorophosphate glass which has an optical-function surface and which has a positioning reference surface for positioning the lens in a fixing tool so that the optical-function surface is not damaged, and a process for the production thereof.

BEST MODES OF THE INVENTION

The lens of the present invention is a lens formed of a fluorophosphate glass and has an optical-function surface and a positioning reference surface for positioning and fixing the lens in a fixing tool (and also for determining the direction of the optical axis), both the optical-function surface and the positioning reference surface being transfer surfaces formed by the transfer of form of a molding surface of a mold according to precision press-molding.

The optical-function surface as used herein refers to a surface through which light to be controlled can pass, that is, a surface that refracts light.

The fluorophosphate glass comes under the group of glasses having low hardness among optical glasses. Moreover, a glass suitable for precision press-molding is required to have a relatively low glass transition temperature. The fluorophosphate glass is liable to cause a reaction on its glass surface with a molding surface of a mold during precision press-molding. When the temperature during the precision press-molding temperature is high, bubbles are generated in the optical-function surface due to the above reaction, and the yielding percentage of the production of lenses is liable to decrease.

For overcoming the above problem, some means are employed to decrease the glass transition temperature. In this case, however, the hardness of the glass is further decreased, and the optical-function surface is more liable to be damaged (scratched) due to its fixing during the centering and edging process. Even if the formation of bubbles during precision press-molding is prevented, the optical-function surface is damaged during the centering and edging process, which means that the function of the lens is impaired.

Meanwhile, the fluorophosphate glass, which is precision press-moldable and has a low glass transition temperature, has a relatively broad temperature range in which the glass is precision press-moldable (the glass does not form bubbles even if the press-molding temperature is set at a little high level). Therefore, the viscosity of the glass can be set at a lower level and the glass can be fully pressed and extended in the space of the mold according to precision press-molding. Therefore, not only the optical-function surface but also an optical-nonfunction surface around the optical-function surface can be precisely formed by the transfer of form of the molding surface of a mold. In the present invention, this optical-nonfunction surface is used as a positioning reference surface.

The above positioning reference surface refers to a reference surface to be used for positioning and fixing a lens in a fixing tool to constitute an optical system. For example, when the optical axes of a plurality of lenses are aligned on a straight line, the positioning reference surfaces of the lenses are brought into contact with a fixing tool and the lenses can be fixed. The lens desirably has, as positioning reference surfaces, a positioning reference surface for determining the position of the lens in the optical axis direction in a fixing tool and a positioning reference surface for determining the position perpendicular to the optical axis. When such lenses are used, the lenses can be fixed to a fixing tool to ensure that the lenses are arranged at intervals of accurate distances, and the above lenses can be also arranged and fixed so that the optical axes of them are aligned on one straight line.

The lens of the present invention has advantages that its optical-function surface has no possibility of being scratched, that the optical-function surface and the positioning reference surface can be formed by carrying out precision press-molding once and that the optical axis of the lens and the position and angle of the positioning reference surface can be accurately set.

The lens is preferably a lens whose entire surfaces are formed of transfer surfaces formed by the transfer of form of the molding surface of a mold according to precision press-molding or formed of transfer surfaces and a free surface or free surfaces. In a lens whose entire surfaces are formed of transfer surfaces and a free surface or free surfaces, desirably, an edge in which transfer surfaces meet with each other or a corner portion in which edges intersect each other is formed of a free surface. The above constitution serves to prevent the chipping of the lens and serves to prevent the occurrence of dust that the edge or corner portion of the lens scrapes the fixing tool to generate when the lens is fixed to the fixing tool.

The above lens also has another advantage that it is free of any cut or ground surface, that is, an advantage that since it has no cutting or grinding scratches, it has high mechanical strength.

[Fluorophosphate Glass]

The fluorophosphate glass for constituting the lens of the present invention includes a fluorophosphate glass containing $Li^+$ as a cationic component and a fluorophosphate glass having a glass transition temperature of 500° C. or lower.

The content of $Li^+$ in the fluorophosphate glass is desirably 1 cationic % or more for decreasing the glass transition temperature.

Specific examples of the above glasses will be explained below.

<Optical Glass I>

As a first embodiment (to be referred to as "optical glass I" hereinafter), there is an optical glass comprising $P^{5+}$ and $Al^{3+}$ as essential components, at least two divalent cationic components ($R^{2+}$) selected from $Mg^{2+}$, $Ca^{2+}$, $Sr^{2+}$ and $Ba^{2+}$ and $Li^+$, and containing, by cationic %, 10 to 45% of the $P^{5+}$, 5 to 30% of the $Al^{3+}$, 0 to 20% of the $Mg^{2+}$, 0 to 25% of the $Ca^{2+}$, 0 to 30% of the $Sr^{2+}$, 0 to 33% of the $Ba^{2+}$, 1 to 30% of the $Li^+$, 0 to 10% of $Na^+$, 0 to 10% of $K^+$, 0 to 5% of $Y^{3+}$ and 0 to 15% of $B^{3+}$, wherein the molar ratio of the content of $F^-$ to the total content of $F^-$ and $O^{2-}$, $F^-/(F^-+O^{2-})$, is from 0.25 to 0.85, the optical glass having a refractive index (nd) of 1.40 to 1.58 and an Abbe's number (vd) of 67 to 90.

The optical glass I is preferably an optical glass that contains, as divalent cationic components ($R^{2+}$), at least two divalent cationic components of $Ca^{2+}$, $Sr^{2+}$ and $Ba^{2+}$.

Further, the optical glass I is preferably an optical glass that has an $Mg^{2+}$, $Ca^{2+}$, $Sr^{2+}$ and $Ba^{2+}$ total content of 1 cationic % or more, and is more preferably an optical glass in which each of the $Mg^{2+}$ content, the $Ca^{2+}$ content, the $Sr^{2+}$ content and the $Ba^{2+}$ content are 1 cationic % or more.

The composition of the above optical glass I will be explained in detail below. Contents of cationic components by % stand for cationic % based on molar ratios of cationic components, and contents of anionic components by % stand for anionic % based on molar ratios of anionic components.

The optical glass I is largely classified into an optical glass Ia in which the molar ratio of the content of $F^-$ to the total content of $F^-$ and $O^{2-}$, $F^-/(F^-+O^{2-})$, is preferably from 0.50 to 0.85 and which has an Abbe's number (vd) of approximately 75 to 90 and an optical glass Ib in which the molar ratio of $F^-/(F^-+O^{2-})$ is preferably from 0.25 to 0.50 and which has an Abbe's number (vd) of approximately 67 to less than 75. These optical glasses Ia and Ib differ in the preferred ranges of contents of their cationic components in the optical glasses Ia and Ib.

$P^{5+}$ is an essential cationic component as a network former of the glass. When the content thereof is less than 10%, the glass is degraded in stability. When it exceeds 45%, the content of oxygen increases since $P^{5+}$ needs to be introduced as an oxide raw material, and the glass fails to satisfy the intended optical properties. The content of $P^{5+}$ is therefore preferably 10 to 45%. For obtaining the optical glass Ia, the content of $P^{5+}$ is preferably in the range of 10 to 40%, more preferably 10 to 35%, still more preferably 12 to 35%, yet more preferably 20 to 35%, further more preferably 20 to 30%. For obtaining the optical glass Ib, the content of $P^{5+}$ is preferably in the range of 25 to 45%, more preferably 25 to 40%, still more preferably 30 to 40%. When $P^{5+}$ is introduced, it is not proper to use $PCl_5$ since it corrodes platinum and violently volatilizes and it hence hampers the stable production. It is preferred to introduce $P^{5+}$ in the form of a phosphate.

$Al^{3+}$ is a component that improves the fluorophosphate glass in stability. When the content thereof is less than 5%, the glass is degraded in stability. When it is over 30%, the glass transition temperature (Tg) and the liquidus temperature (LT) greatly increase, and hence the molding temperature increases and striae intensely occur due to surface volatilization during the molding. Therefore, a homogeneous glass shaped material, in particular a press-molding preform can be no longer produced. It is therefore preferred to limit the content of $Al^{3+}$ to 5 to 30%. For obtaining the optical glass Ia, the content of $Al^{3+}$ is preferably in the range of 7 to 30%, more preferably 8 to 30%, still more preferably 10 to 30%, yet more preferably 15 to 25%. For obtaining the optical glass Ib, the content of $Al^{3+}$ is preferably in the range of 5 to 20%, more preferably 5 to 12%.

When $Mg^{2+}$, $Ca^{2+}$, $Sr^{2+}$ and $Ba^{2+}$ as divalent cationic components ($R^{2+}$) are introduced, they serve to improve the stability of the glass, and two or more components of these are introduced, or it is more preferred to introduce two or more components of $Ca^{2+}$, $Sr^{2+}$ and $Ba^{2+}$. For more improving the effect produced by the introduction of the divalent cationic components ($R^{2+}$), it is preferred to adjust the total content of $Mg^{2+}$, $Ca^{2+}$, $Sr^{2+}$ and $Ba^{2+}$ to 1 cationic % or more. When they are introduced in amounts exceeding their own upper limits, the stability sharply decreases. $Ca^{2+}$ and $Sr^{2+}$ can be introduced in relatively large amounts. When $Mg^{2+}$ and $Ba^{2+}$ are introduced in large amounts, the stability in particular is decreased. Since, however, $Ba^{2+}$ is a component that can realize a high refractive index while maintaining low dispersion, it is preferred to introduce a large amount of $Ba^{2+}$ so long as the stability is not impaired. Therefore, it is preferred to limit the content of $Mg^{2+}$ to 0 to 20%. For obtaining the optical glass Ia, the content of $Mg^{2+}$ is preferably 1 to 20%, more preferably 3 to 17%, still more preferably 3 to 15%, yet more preferably 5 to 15%, further preferably 5 to 10%. For obtaining the optical glass Ib, the content of $Mg^{2+}$ is preferably 0 to 15%, more preferably 0 to 12%, still more preferably 1 to 10%.

Further, the content of $Ca^{2+}$ is preferably 0 to 25%. For obtaining the optical glass Ia, the content of $Ca^{2+}$ is preferably 1 to 25%, more preferably 3 to 24%, still more preferably 3 to 20%, yet more preferably 5 to 20%, particularly preferably 5 to 16%. For obtaining the optical glass Ib, the content of $Ca^{2+}$ is preferably 0 to 15%, more preferably 1 to 10%.

Further, the content of $Sr^{2+}$ is preferably 0 to 30%. For obtaining the optical glass Ia, the content of $Sr^{2+}$ is preferably 1 to 30%, more preferably 5 to 25%, still more preferably 7 to 25%, yet more preferably 8 to 23%, further more preferably 9 to 22%, particularly preferably 10 to 20%. For obtaining the optical glass Ib, the content of $Sr^{2+}$ is preferably 0 to 15%, more preferably 1 to 15%, still more preferably 1 to 10%.

The content of $Ba^{2+}$ is preferably 0 to 33%. For obtaining the optical glass Ia, the content of $Ba^{2+}$ is preferably 0 to 30%, more preferably 0 to 25%, still more preferably 1 to 25%, yet more preferably 1 to 20%, further more preferably 3 to 18%, still further more preferably 5 to 15%, particularly preferably 8 to 15%. For obtaining the optical glass Ib, the content of $Ba^{2+}$ is preferably 0 to 30%, more preferably 10 to 30%, still more preferably 15 to 30%, yet more preferably 15 to 25%.

$Li^+$ is an important component that decreases the glass transition temperature (Tg) without impairing the stability. When the content thereof is less than 1%, such an effect is not sufficient. When it is over 30%, the durability of the glass is impaired and at the same time the processability of the glass is decreased. Therefore, the content thereof is preferably 1 to 30%, more preferably 2 to 30%, still more preferably 3 to 30%, yet more preferably 4 to 30%. For obtaining the optical glass Ia, the content of $Li^+$ is preferably 4 to 25%, more preferably 5 to 25%, still more preferably 5 to 20%. For obtaining the optical glass Ib, the content of $Li^+$ is preferably 5 to 30%, more preferably 10 to 25%.

$Na^+$ and $K^+$ have the effect on decreasing the glass transition temperature (Tg) like $Li^+$, while they tend to simultaneously increase the thermal expansion coefficient to a great extent as compared with $Li^+$. Further, NaF and KF have a larger solubility in water than LiF and hence degrade the water resistance of the glass, so that it is preferred to limit the content of each of $Na^+$ and $K^+$ to 0 to 10%. In the optical glasses Ia and Ib, the content of each of $Na^+$ and $K^+$ is preferably in the range of 0 to 5%, and it is more preferred not to introduce any of them.

$Y^{3+}$ has an effect on improving the glass in stability and durability. When the content thereof is over 5%, however, the stability is rather degraded and the glass transition temperature (Tg) increases to a great extent. It is therefore preferred to limit the content thereof to 0 to 5%. For obtaining the optical glass Ia, the content of $Y^{3+}$ is preferably 0 to 3%, more preferably 0.5 to 3%. For obtaining the optical glass Ib, the content of $Y^{3+}$ is preferably 0 to 4%, more preferably 0 to 3%, still more preferably 0.5 to 3%.

$B^{3+}$ is a glass-forming component and hence has an effect on stabilization of the glass. When it is introduced to excess, it degrades the durability, and with an increase in the content of $B^{3+}$, the content of $O^{2-}$ in the glass increases, so that it is difficult to attain the intended optical properties. The content of $B^{3+}$ is therefore preferably adjusted to 0 to 15%. However, it is easily volatilized in the form of $BF_3$ during melting, which causes striae. In both the optical glasses Ia and Ib, the content of $B^{3+}$ is preferably 0 to 10%, more preferably 0 to 5%. When reducing the volatilization of the glass has priority, it is preferred to limit the content thereof to 0 to 0.5%, and it is more preferred not to introduce any $B^{3+}$.

For stably producing high-quality optical glasses, the total content of $P^{5+}$, $Al^{3+}$, $Mg^{2+}$, $Ca^{2+}$, $Sr^{2+}$, $Ba^{2+}$, $Li^+$ and $Y^{3+}$ by cationic % in each of the optical glasses Ia and Ib is preferably over 95%, more preferably over 98%, still more preferably over 99%, yet more preferably 10%.

In addition to the above cationic components, the optical glass I may contain, as cationic components, Ti, Zr, Zn or lanthanoids such as La, Gd, etc., in such amount ranges that do not impair the predetermined properties.

Further, $Si^{4+}$ can be introduced for stabilizing the glass. Since, however, its melting temperature is high, a non-melt portion may be left when it is introduced to excess, or more volatilization takes place during melting, which comes to impair the production stability. In each of the optical glasses Ia and Ib, therefore, the content of $Si^{4+}$ is preferably 0 to 10%, more preferably 0 to 8%, still more preferably 0 to 5%.

With regard to the contents of anionic components, the molar ratio of the content of $F^-$ to the total content of $F^-$ and $O^{2-}$, $F^-/(F^-+O^{2-})$, is adjusted to from 0.25 to 0.85 for obtaining an optical glass that materializes the predetermined optical properties and that at the same time excellent stability. In the optical glass Ia, the above molar ratio is preferably from 0.50 to 0.85, and in the optical glass Ib, the above molar ratio is preferably from 0.25 to less than 0.50, more preferably from 0.27 to 0.45, still more preferably 0.3 to 0.45. In any of the optical glasses Ia and Ib, preferably, the total content of $F^-$ and $O^{2-}$ in anions is 100%.

The optical glass I has a refractive index ($n_d$) of approximately 1.40 to 1.58 and an Abbe's number (vd) of approximately 67 to 90, preferably 70 to 90. Further, the above Abbe's number (vd) of the optical glass Ia is approximately 75 to 90, preferably 78 to 89, and the above Abbe's number (vd) of the optical glass Ib is approximately 67 to less than 75.

The optical glass I exhibits a high transmittance in the visible light region except when a colorant is added. When a 10 mm thick sample having two flat surfaces that are in parallel with each other is prepared from the above optical glass I and when light is caused to enter the sample in the direction perpendicular to the above two surfaces, the transmittance that the optical glass I exhibits to light having a wavelength of 400 to 2,000 nm (excluding a reflection loss on the sample surface) is generally 80% or more, preferably 95% or more.

Since the optical glass I has a predetermined content of $Li^+$, the glass transition temperature (Tg) that the optical glass I comes to have is generally 470° C. or lower, preferably 430° C. or lower.

Further, since $Li^+$ of alkali metal ions is positively incorporated into the optical glass I, the optical glass I has a relatively small thermal expansion coefficient and exhibits relatively excellent water resistance. The above properties are advantageous for giving a smooth and quality finish to the glass surface when a precision press-molding preform is formed by polishing the glass.

Since the optical glass I exhibits excellent water resistance and chemical durability, there can be obtained a lens whose surface is less susceptible to alteration and is free from fogging for a long period of time.

The optical glass I can have a glass melting temperature lower by approximately 50° C. than a glass having optical constants equivalent to those of the optical glass I and containing no Li, so that there can be decreased or overcome failures such as the coloring of the glass, the inclusion of bubbles and the occurrence of striae which are caused by the melting of platinum into the glass from a vessel during melting.

A fluorophosphate glass generally has a high viscosity when it flows out, and it has a defect that when a molten glass gob having a predetermined mass is separated from a molten glass flowing out and shaped, a glass forms a fine thread from a separation portion, and this thread-like portion remains in a shaped glass gob to form a projection. When an attempt is made to overcome the above defect by decreasing the viscosity of the glass that is flowing out, it is required to increase the temperature at which the glass is caused to flow out, and as described already there is caused a problem that the volatilization of fluorine from the glass surface is aggravated to intensify striae.

For decreasing the temperature suitable for shaping a molten glass in order to overcome the above problem, the optical glass I has a glass composition that is determined to ensure that the temperature at which it exhibits a predetermined viscosity is lower than a temperature at which a conventional fluorophosphate glass does. The glass transition temperature is a much lower temperature than a temperature for shaping a molten glass, and when a glass has a low glass transition temperature, the above shaping temperature for the glass can be set at a lower temperature. For reducing or overcoming the problems of thread formation, striae, etc., therefore, the glass composition is adjusted so that the glass comes to have a glass transition temperature in the above range.

When the glass transition temperature is decreased, the temperature for heating a glass in the press-molding of a preform, in particular, in the precision press-molding of a preform can be decreased, and there can be produced effects that a reaction between a glass and a press mold is alleviated and that the length of lifetime of the press mold can be extended.

Therefore, the optical glass I is suitable as a glass material for press molding, in particular as a glass material for precision press-molding.

The optical glass I can be obtained by preparing a phosphate raw material, a fluoride raw material, etc., weighing and mixing these raw materials, supplying the thus-prepared mixture to a melting vessel made of a platinum alloy, carrying out heating, melting, refining and homogenization, causing a molten glass to flow out of a pipe and shaping a glass.

<Optical Glass II>

A second embodiment (to be referred to as "optical glass II" hereinafter) will be explained below.

As an optical glass II, there is a glass that is a fluorophosphate glass and that exhibits a viscosity of 30 dPa·s at a temperature of 700° C. or lower.

In the optical glass II, similarly, a glass containing 1 to 30 cationic % of $Li^+$ is preferred, a glass containing 2 to 30 cationic % of $Li^+$ is more preferred, a glass containing 3 to 30 cationic % of $Li^+$ is still preferred, and a glass containing 4 to 30 cationic % of $Li^+$ is yet more preferred.

Desirably, the optical glass II similarly contains one or two or more of $Mg^{2+}$, $Ca^{2+}$, $Sr^{2+}$ and $Ba^{2+}$ as divalent cationic components ($R^{2+}$). An optical glass II having an $Mg^{2+}$, $Ca^{2+}$, $Sr^{2+}$ and $Ba^{2+}$ total content of 1 cationic % or more is preferred, and an optical glass II having $Mg^{2+}$, $Ca^{2+}$, $Sr^{2+}$ and $Ba^{2+}$ contents of 1 cationic % or more each is more preferred. An optical glass II containing two or more of $Mg^{2+}$, $Ca^{2+}$, $Sr^{2+}$ and $Ba^{2+}$ is more desirable. Specifically, a glass containing $Mg^{2+}$ and $Ca^{2+}$, a glass containing $Sr^{2+}$ and $Ba^{2+}$, a glass containing $Ca^{2+}$ and $Sr^{2+}$, a glass containing $Mg^{2+}$ and $Ba^{2+}$, a glass containing $Mg^{2+}$ and $Sr^{2+}$, a glass containing $Ca^{2+}$ and $Ba^{2+}$, a glass containing $Mg^{2+}$, $Ca^{2+}$ and $Sr^{2+}$, a glass containing $Mg^{2+}$, $Ca^{2+}$ and $Ba^{2+}$, a glass containing $Mg^{2+}$, $Sr^{2+}$ and $Ba^{2+}$, a glass containing $Ca^{2+}$, $Sr^{2+}$ and $Ba^{2+}$ and a glass containing $Mg^{2+}$, $Ca^{2+}$, $Sr^{2+}$ and $Ba^{2+}$ are preferred.

In each of the above glasses containing one or more of $Mg^{2+}$, $Ca^{2+}$, $Sr^{2+}$ and $Ba^{2+}$, it is preferred to adjust the content of each of such divalent cationic components to 0.5 cationic % or more, and it is more preferred to adjust the content of each of them to 1 cationic % or more. Having such compositions, the above glasses can be improved in stability.

The optical glass II has preferred compositions and optical constants in common with the optical glass I. Therefore, the optical glass II also has suitable glass components, contents thereof, optical constants and other properties in common with the above optical glass I. In addition, the optical glass II is not necessarily required to satisfy the requirements of the optical glass I with regard to glass components and contents thereof. Preferably, the optical glass II satisfies any one of the requirements of the optical glass I with regard to glass components and contents thereof, and more preferably, the optical glass II satisfies all the requirements of the optical glass I.

According to the optical glass II, problems such as formation of a thread, striae, etc., during the shaping of a molten glass can be overcome.

The above formation of a thread during the shaping can be overcome by increasing the temperature for shaping a molten glass into a preform (the temperature of a glass immediately after it is caused to flow out) so that the viscosity of the glass is decreased. On the other hand, striae during the shaping can be reduced or prevented by decreasing the temperature for shaping a molten glass into a preform. Conventional fluorophosphate glasses have had difficulties in satisfying these two requirements. However, the present inventors have found that the lower limit of the preform-shaping temperature (the temperature of a glass immediately after it is caused to flow out) corresponds to a temperature at which the glass exhibits a viscosity of 30 dPa·s, and there is provided an optical glass that exhibits the above viscosity of 30 dPa·s at 700° C. or lower, whereby the occurrence of striae can be reduced or prevented while preventing the formation of a thread.

Similarly, the optical glass I is preferably a glass that exhibits a viscosity of 30 dPa·s at a temperature of 700° C. or lower, and both the optical glasses I and II are more preferably glasses that exhibit a viscosity of 30 dPa·s at a temperature of 680° C. or lower.

[Precision Press-Molding Preform and Process for the Production Thereof]

A first embodiment (to be referred to as "preform I" hereinafter) of the precision press-molding preform of the present invention is a preform formed of the above optical glass.

The precision press-molding preform as used herein refers to a material obtained by pre-shaping a glass having a mass equivalent to the mass of a press-molded product into a form suitable for precision press-molding.

For example, when a press-molded product having one axis of rotational symmetry and being symmetrical with regard to any rotational angle about the axis of rotational symmetry, such as a lens, is produced, the preform therefor preferably has one axis of rotational symmetry and is symmetrical with regard to any rotational angle about this axis of rotational symmetry, or preferably has the form of a sphere. Further, when precision press-molding is carried out, a preform may be pressed in a state where an ambient gas is trapped between the molding surface of a press mold and the preform surface, and hence the form accuracy of a press molded product may be degraded. It is desirable to determine the curvature of the preform surface by taking account of the curvature of molding surface of a press mold so that the above degradation of the form accuracy may not take place. When the above precision press-molding preform is used, any one of known various films that work to fully extend a glass in the press mold during the precision press-molding and known various films for improving mold releasability may be formed on the entire surface of the preform.

A second embodiment (to be referred to as "preform II" hereinafter) of the precision press-molding preform for use in the present invention is a preform formed of a fluorophosphate optical glass having a glass transition temperature of 450° C. or lower. In the preform II for use in the present invention, the glass transition temperature thereof is preferably 440° C. or lower, more preferably 430° C. or lower, still more preferably 420° C. or lower, yet more preferably 410° C. or lower, further more preferably 400° C. or lower.

Fluorophosphate glasses generally have low glass transition temperatures, and of these, the fluorophosphate glass constituting the preform II has in particular a lower glass transition temperature. Since fluorophosphate glasses generally have low glass transition temperatures, it has been though that they have no particular problem concerning precision press-molding. However, it has been difficult to produce lenses from them by precision press-molding at high yields. The reason therefor is as follows. General fluorophosphate glasses have glass transition temperatures of over 460° C. but not higher than 600° C., and such fluorophosphate glasses have narrow temperature ranges suitable for precision press-molding. When the temperature of such glasses during the precision press-molding slightly decreases, the glasses crack, and when the above temperature slightly increases, the glasses form bubbles and quality lenses can be no longer obtained.

In contrast, according to the above preform II, the glass transition temperature thereof is controlled so that it is 450° C. or lower. Therefore, the temperature range set for the precision press-molding can be broadened, and lenses free of cracking or formed bubbles can be stably produced.

Further, when the glass transition temperature is decreased to a lower level, the temperature for annealing after the precision press-molding can be set at a lower temperature. The optimum temperature during annealing changes in conjunction with the glass transition temperature since the annealing is carried out in the range of (glass transition temperature −10) to (glass transition temperature −50)° C. When the annealing temperature is high, part of fluorine present on the surface of a precision press-molded product is replaced with oxygen in an atmosphere, so that the refractive index on the lens surface slightly increases. This phenomenon is influenced by whether the annealing temperature is high or low. When an optical multi-layer film such as an anti-reflection film is formed on a lens, even if an optimum optical multi-layer film is designed so as to be suitable for the optical properties of the glass, the coating of the optical multi-layer film comes to be no longer optimum due to the above change in refractive index on the surface layer.

However, when the above preform II is used, the annealing temperature can be decreased and the above replacement of fluorine with oxygen can be suppressed to keep the refractive index on the lens surface from changing, so that the design of the optical multi-layer film can be optimized on the basis of the optical properties of the glass. When the preform II is used, further, the temperature for precision press-molding can be decreased and hence the time period required for temperature-increasing the preform before the precision press-molding and the time period required for temperature-decreasing a glass molded product after the precision press-molding can be decreased, which can also attain an improvement in productivity. For controlling the glass transition temperature of the above preform II so that it is 450° C. or lower, it is preferred to introduce Li cation as a glass component, and it is more preferred to adjust the content thereof to 1 to 30 cationic %. Further, it is desirable to determine contents of anion components to ensure that the molar ratio of the content of $F^-$ to the total content of $F^-$ and $O^{2-}$, $F^-/(F^-+O^{2-})$, is from 0.25 to 0.85. Further, the fluorophosphate optical glass constituting the above preform II is preferably an optical glass that satisfies some of the requirements of components of the above optical glass I, and is more preferably an optical glass that satisfies all of such requirements.

The preform II is preferably a preform that has the constitution of the preform I, i.e., a preform formed of the above optical glass.

The entire surface of each of the preforms I and II is preferably a surface formed by solidification of a glass in a molten state.

When the preforms I and II are constituted of a fluorophosphate glass having the performance of transmittance in which the fluorophosphate glass having a thickness of 10 mm has an external transmittance of 80% or more in the entire region of wavelengths of 370 to 700 nm, colorless and transparent lenses can be produced therefrom by precision press-molding.

The process for the production of a precision press-molding preform for use in the present invention will be explained below.

In a first embodiment (to be referred to as "preform production process I" hereinafter) of the process for the production of a preform for use in the present invention, a molten glass is caused to flow out of a pipe, a molten glass gob having a predetermined mass is separated and the gob is shaped into a preform formed of the above optical glass in the cooling process of the glass.

The molten glass is caused to continuously flow out of a pipe made of platinum alloy or platinum at a constant rate, the pipe being heated to a predetermined temperature by an electric heating method or a high-frequency dielectric heating method or a combination of these two heating methods. A molten glass gob having a mass equivalent to the mass of one preform or having a mass obtained by adding a mass of portion to be removed as will be described later to the mass of one preform is separated. When the molten glass gob is separated, it is desirable not to use a cutting blade so that a cutting blade mark may not be left. For example, it is preferred to employ a method in which a molten glass is dropped off from the outlet of the pipe or a method in which the forward end of a molten glass flow that is flowing out is supported with a supporter and the supporter is sharply fallen at a time at which a molten glass gob having an intended mass can be separated, to separate the molten glass gob from the molten glass flow by utilizing the surface tension of the molten glass.

When the temperature of the glass that is flowing out is set at 700° C. or lower, no phenomenon of thread formation is observed in the glass that exhibits a viscosity of 30 dPa·s at a temperature of 700° C. or lower during the separation of the above molten glass gob.

The thus-separated molten glass gob is shaped into a desired form on/above the concave portion of a preform shaping mold in the cooling process of the glass. In this case, preferably, the shaping is carried out in a state where the glass gob is floated above the concave portion by application of upward gas pressure, for preventing the formation of wrinkles on the preform surface and the breaking of the glass called a cracking in the cooling process of the glass.

After the temperature of the glass has decreased to a temperature range in which the glass is no more deformable by application of an external force, the preform is taken out of the preform shaping mold and gradually cooled.

For decreasing the volatilization of fluorine from the glass surface, preferably, the glass is caused to flow out, and the preform is shaped, in a dry atmosphere (dry atmosphere having a dew point of −50° C. or lower)

The above optical glass is almost free from the occurrence of striae. When striae slightly occur on the preform surface, the striae locally exist in the surface layer of the preform, and the above surface layer is hence removed by etching or polishing, whereby a striae-free optically highly homogeneous preform can be completed.

When the above etching is carried out, the surface layer of the entire surface of the preform is removed by immersing the preform in an acid or alkali etching solution or by pouring an etching solution all over the preform surfaces. After the etching, the preform is washed and dried.

When the surface layer is removed by polishing, it is desirable to remove the surface layer of the entire surface of the preform as well. The polishing is suitable for a spherical preform or a preform having a flat surface, and the etching can cope with various forms regardless of forms.

In any case of the etching and polishing, desirably, a molten glass gob having a mass obtained by adding a glass mass to be removed to an intended preform mass is separated and the surface layer is removed to leave the intended mass.

In a second embodiment (to be referred to as "preform production process II" hereinafter) of the process for the production of a precision press-molding preform for use in the present invention, a molten glass is shaped into a glass shaped material and the glass shaped material is machined to produce a preform formed of the above optical glass.

The method of removing the entire surface of a preform by polishing in the preform production process I corresponds to the preform production process II in which the glass shaped material is machined. Other method that is not explained in the preform production process I will be explained below.

First, a molten glass is caused to continuously flow out of a pipe and caused to flow into a mold arranged below the pipe. As the mold, there is used a mold having a flat bottom and three side walls surrounding the bottom and having one open side. The mold is arranged and fixed in a manner that the two side walls in contact with the open side and the bottom face each other in parallel, that the center of the bottom is positioned right below the pipe in the vertical direction and that the bottom surface is at a horizontal level, molten glass is caused to flow into the mold and spread in a region surrounded by the side walls so as to have a uniform thickness, and after glass is cooled, the glass is horizontally withdrawn at a constant rate from the open side. The withdrawn glass shaped material is transferred into an annealing furnace to be annealed. In the above manner, there is obtained a plate-like glass shaped material formed of the above optical glass having a constant width and a constant thickness.

Then, the plate-like shaped material is cut or split into a plurality of glass pieces called cut pieces, and these glass pieces are ground and polished to complete press-molding preforms having an intended mass each.

In another method, a mold having a cylindrical through hole is arranged and fixed right below the pipe in the vertical direction in a manner that the central axis of the through hole is in the vertical direction. In this case, preferably, the mold is arranged to ensure that the central axis of the through hole is positioned right below the pipe in the vertical direction. And, a molten glass is caused to flow into the mold through hole from the pipe at a constant flow rate to fill glass in the through hole, and a solidified glass is withdrawn in the vertical direction from the lower end outlet of the through hole at a constant rate and gradually cooled to obtain a columnar rod-like glass shaped material. The thus-obtained glass shaped material is annealed and then cut or split in the direction perpendicular to the central axis of the columnar rod to obtain a plurality of glass pieces. The glass pieces are ground and polished to complete press-molding preforms having a desired mass each.

Both the preform production processes I and II enable the production of preforms having high quality and high mass accuracy and are hence suitable as a method for producing a precision press-molding preform.

[Process for the Production of Lens]

The lens of the present invention is a lens formed of the above fluorophosphate glass, which has an optical-function surface and a positioning reference surface for positioning and fixing the lens in a fixing tool, both the optical-function surface and the positioning reference surface being transfer surfaces formed by the transfer of form of a molding surface of a mold according to precision press-molding.

When both the optical-function surface and the positioning reference surface are formed by precision press-molding as described already, it is not necessary to process the lens while pressing the optical-function surface. Even in a lens formed of a precision press-moldable fluorophosphate glass, therefore, damaging of the optical-function surface can be prevented.

The lens of the present invention includes not only an aspherical lens but also a spherical lens. When classified on the basis of forms, the lens of the present invention includes lenses having such forms as a convex meniscus lens, a biconvex lens, a planoconvex lens, a concave meniscus lens, a biconcave lens and a planoconcave. lens Further, the present invention includes a lens whose optical-function surface is provided with a fine pattern for controlling light by means of diffraction.

In view of use, the lens of the present invention includes lenses for constituting image-sensing systems such as a lens for a digital still camera, a lens for a digital video camera, an interchangeable lens for a single-lens reflex camera, etc., an image-sensing lens for a camera mounted on a mobile device such as a cellular phone, etc., a lens for a car-mounted camera, a pick-up lens for an optical recording medium, a collimator lens, a lens for optical communication, and the like.

A lens for a camera mounted on a mobile device such as a cellular phone, etc., a pick-up lens and a lens for optical communication have a problem that the centering and edging process therefor is difficult since they are small in size. According to the lens of the present invention, a positioning reference surface can be formed as well by precision press-molding, so that the above small-size lenses can be highly accurately fixed to fixing tools.

The optical-function surface of the lens can be provided with an optical multi-layer film such as an anti-reflection film or a single-layer film.

The process for the production of a lens, provided by the present invention, will be explained below.

The process for the production of a lens, provided by the present invention, is a process for the production of a lens formed of a fluorophosphate glass and comprises heating a preform of said glass to soften it and precision press-molding the preform with a mold, wherein forms of the molding surface of said mold are transferred to form an optical-function surface and a positioning reference surface for positioning and fixing the lens in a fixing tool.

Since the precision press-molding method per se is known, an explanation thereof will be omitted. The lens of the present invention can be produced according to the above process. This process has advantages similar to the already explained advantages of the lens of the present invention.

The fluorophosphate glass for use and lenses suitable as objects of the production are also similar to those which have been explained already.

Figure 1:
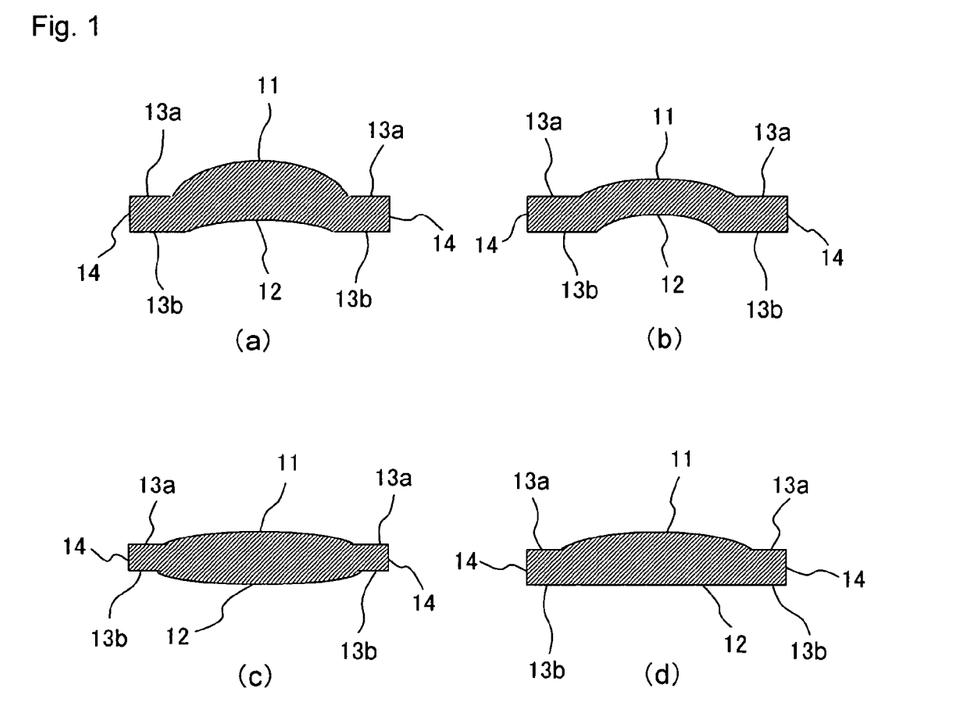
FIG. 1 shows cross-sectional views of centering- and edging-processing-free lenses, in which reference numerals 11 and 12 indicate lens surfaces and 13a, 13b and 14 indicate positioning reference surfaces.

Centering- and edging-processing-free lenses having typical forms include lenses shown in FIGS. 1(a) to 1(d).

In FIGS. 1(a) to 1(d), reference numerals 11 and 12 indicate lens surfaces and 13a, 13b and 14 indicate positioning reference surfaces.

EXAMPLES

The present invention will be explained further in detail with reference to Examples hereinafter, while the present invention shall never be limited by these Examples.

Phosphates, fluorides, etc., corresponding to glass components, were used as raw materials for a glass, and the raw materials were weighed so as to obtain a glass having a composition shown in Table 1-1 or Table 1-2 and fully mixed, and then the mixture was charged into a platinum crucible and melted with stirring under heat for 1 to 3 hours at a temperature range of 850 to 950° C. in atmosphere in an electric furnace. A homogenized and refined glass melt was cast into a 40×70×15 mm die made of carbon. A cast glass was allowed to cool to a transition temperature and immediately thereafter the cooled glass was transferred into an annealing furnace, annealed around the transition temperature for 1 hour and gradually cooled to room temperature in the annealing furnace. In the above manner, optical glasses shown in Tables 1-1 and 1-2 were obtained.

When each of the thus-obtained glasses was observed by enlarging them through a microscope, no precipitation of a crystal was found, nor was a non-melt remainder of any raw material found.

Each of the above-obtained optical glasses was measured for a refractive index (nd), an Abbe's number (vd), a glass transition temperature (Tg) and a temperature at which each glass exhibited a viscosity of 30 dPa·s by the following methods and Tables 1-1 and 1-2 show the results.

(1) Refractive index (nd) and Abbe's number (vd)

An optical glass obtained at a gradually cooling temperature-decreasing rate of −30° C./hour was measured.

(2) Glass transition temperature (Tg)

Measured with an apparatus for thermomechanical analysis (ThermoPlus TMA 8310) supplied by Rigaku Corporation at a temperature elevation rate of 4° C./minute.

(3) A temperature at which a viscosity of 30 dPa·s is exhibited

The method for this measurement is as follows.

Measured with a coaxial double rotary cylindrical rotational viscometer (high-temperature viscosity measuring apparatus RHEOTRONIC II (upgraded model) supplied by Tokyo Kogyou Kabushiki Kaisha) according to the viscosity measurement method under JIS Standard Z8803. For determining a temperature at which a glass exhibits a viscosity of 30 dPa·s, it is simple and easy to employ a method in which the temperature of the glass is changed, the glass is measured for a viscosity at each of changed temperatures, a graph showing a relationship between a viscosity and a temperature is prepared and the graph is used to read a temperature at which the glass exhibits a viscosity of 30 dPa·s.

TABLE 1

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $P^{5+}$ | 26.0 | 27.0 | 27.0 | 27.0 | 27.0 | 27.0 | 27.0 | 33.0 | 29.0 | 27.0 | 27.0 | 26.0 | 13.0 | 17.0 |
| $Al^{3+}$ | 20.0 | 21.0 | 21.0 | 21.0 | 21.0 | 21.0 | 21.0 | 21.0 | 19.1 | 15.0 | 11.0 | 21.0 | 21.0 | 27.0 |
| $Mg^{2+}$ | 10.0 | 4.0 | 8.0 | 8.0 | 12.0 | 7.3 | 4.9 | 6.3 | 6.6 | 8.3 | 9.0 | 7.5 | 9.7 | 8.0 |
| $Ca^{2+}$ | 17.0 | 14.0 | 18.0 | 19.5 | 14.0 | 9.1 | 6.2 | 7.9 | 8.3 | 10.5 | 11.3 | 9.3 | 12.1 | 10.0 |
| $Sr^{2+}$ | 17.0 | 17.0 | 17.0 | 17.0 | 17.0 | 15.6 | 10.5 | 13.4 | 14.1 | 17.7 | 19.2 | 15.9 | 20.7 | 17.0 |
| $Ba^{2+}$ | 5.0 | 12.0 | 6.0 | 4.5 | 6.0 | 11.0 | 7.4 | 9.4 | 9.9 | 12.5 | 13.5 | 11.3 | 14.5 | 12.0 |
| $Li^+$ | 4.0 | 4.0 | 2.0 | 2.0 | 2.0 | 8.0 | 22.0 | 8.0 | 12.0 | 8.0 | 8.0 | 8.0 | 8.0 | 8.0 |

TABLE 1-continued

| | | | | | | | | | | | | | | |
|---|---|---|---|---|---|---|---|---|---|---|---|---|---|---|
| Na$^+$ | 0.0 | 0.0 | 0.0 | 0.0 | 0.0 | 0.0 | 0.0 | 0.0 | 0.0 | 0.0 | 0.0 | 0.0 | 0.0 | 0.0 |
| Y$^{3+}$ | 1.0 | 1.0 | 1.0 | 1.0 | 1.0 | 1.0 | 1.0 | 1.0 | 1.0 | 1.0 | 1.0 | 1.0 | 1.0 | 1.0 |
| Total Amount | 100 | 100 | 100 | 100 | 100 | 100 | 100 | 100 | 100 | 100 | 100 | 100 | 100 | 100 |
| F$^-$/(F$^-$+O$^{2-}$) | 0.641 | 0.628 | 0.632 | 0.632 | 0.632 | 0.621 | 0.595 | 0.538 | 0.582 | 0.611 | 0.603 | 0.635 | 0.818 | 0.768 |
| Tg[°C.] | 428 | 430 | 446 | 445 | 449 | 417 | 359 | 420 | 396 | 393 | 383 | 406 | 383 | 400 |
| nd | 1.490 | 1.503 | 1.495 | 1.494 | 1.493 | 1.500 | 1.488 | 1.511 | 1.505 | 1.505 | 1.507 | 1.495 | 1.464 | 1.468 |
| vd | 82 | 81 | 82 | 81 | 82 | 81 | 81 | 79 | 79 | 80 | 79 | 82 | 88 | 88 |
| Temperature (°C.) at which a viscosity of 30 dPa·s is exhibited | — | — | — | — | — | 665 | — | — | — | 642 | — | 648 | — | — |

| | 15 | 16 | 17 | 18 | 19 | 20 | 21 | 22 | 23 | 24 | 25 |
|---|---|---|---|---|---|---|---|---|---|---|---|
| P$^{5+}$ | 38.0 | 38 | 34 | 38 | 38 | 29 | 29 | 31 | 38 | 35 | 35 |
| Al$^{3+}$ | 17.0 | 9 | 9 | 9 | 9 | 9 | 9 | 9 | 9 | 12 | 9 |
| Mg$^{2+}$ | 0 | 6 | 6 | 4 | 6 | 6 | 6 | 10 | 6 | 6 | 9 |
| Ca$^{2+}$ | 4.0 | 4 | 8 | 6 | 4 | 2 | 4 | 4 | 4 | 4 | 4 |
| Sr$^{2+}$ | 5.0 | 5 | 13 | 5 | 5 | 5 | 5 | 5 | 5 | 5 | 5 |
| Ba$^{2+}$ | 22.0 | 16 | 16 | 16 | 16 | 27 | 23 | 19 | 16 | 16 | 16 |
| Li$^+$ | 13.0 | 21 | 13 | 21 | 21 | 21 | 21 | 21 | 18 | 21 | 21 |
| Na$^+$ | 0.0 | 0 | 0 | 0 | 0 | 0 | 0 | 0 | 3 | 0 | 0 |
| Y$^{3+}$ | 1.0 | 1 | 1 | 1 | 1 | 1 | 3 | 1 | 1 | 1 | 1 |
| Total Amount | 100 | 100 | 100 | 100 | 100 | 100 | 100 | 100 | 100 | 100 | 100 |
| F$^-$/(F$^-$+O$^{2-}$) | 0.389 | 0.335 | 0.375 | 0.335 | 0.274 | 0.423 | 0.429 | 0.416 | 0.335 | 0.390 | 0.380 |
| Tg[°C.] | 427 | 374 | 420 | 372 | 392 | 367 | 367 | 364 | 357 | 366 | 355 |
| nd | 1.553 | 1.5499 | 1.55049 | 1.55224 | 1.55772 | 1.54692 | 1.54567 | 1.5357 | 1.54194 | 1.5353 | 1.53816 |
| vd | 73 | 71.5 | 72.2 | 71.0 | 70.8 | 72.3 | 72.6 | 73.4 | 71.5 | 72.9 | 72.3 |
| Temperature (°C.) at which a viscosity of 30 dPa·s is exhibited | — | 625 | 660 | — | 650 | 630 | 625 | 625 | 650 | 640 | — |

As shown in Tables 1-1 and 1-2, all of the optical glasses obtained had desired refractive indices, Abbe's numbers and glass transition temperatures and exhibited low-temperature softening properties and meltability and they were suitable as optical glasses for precision press-molding.

Further, preforms were produced from glasses having compositions shown in Tables 1-1 and 1-2 as follows. A refined and homogenized molten glass was caused to flow out of a pipe made of a platinum alloy at a constant rate, the pipe being temperature-adjusted in a temperature range in which the glass stably flowed out without being devitrified. And, molten glass gobs having a mass of an intended preform each were separated by a method in which a glass was caused to drop or the forward end of a glass was supported with a supporter and then the supporter was rapidly moved downward to separate a glass gob. Then, the thus-obtained molten glass gob was received with a receptor mold having a gas ejection port in its bottom, and the glass gob was shaped while it was caused to float by ejecting a gas from the gas ejection port to produce a press-molding preform. Preforms obtained in the above manner had the form of a sphere or the form of a flattened sphere by adjusting and setting the intervals of separating molten glass gobs from the molten glass. The preforms obtained had masses that were accurately equal to set values, and all of the preforms had smooth surfaces.

In another method, the entire surface layer of each of the shaped spherical preforms was removed by polishing the entire surfaces thereof to give optically uniform preforms.

In another method, molten glasses were cast into casting molds to shape them in the form of a plate-like glass or a cylindrical rod and these glasses were annealed and then cut to obtain glass pieces. The surface of each of the glass pieces was ground and polished to give preforms whose entire surfaces were smooth.

The thus-obtained preforms are checked as to whether or not each of the masses thereof is accurately equal to the specified mass value of a lens, and only the preforms having an accurately equal mass each are used in the step of precision press-molding.

The precision press-molding was carried out as follows. A press mold having an upper mold member, a lower mold member and a sleeve member was provided and a preform was placed between the lower mold member and the upper mold member and then heated together with the press mold in a nitrogen atmosphere. The temperature inside the press mold was set at a temperature at which the glass to be shaped exhibited a viscosity of $10^8$ to $10^{10}$ dPa·s, and while this temperature was maintained, the upper mold member was moved downward to press the preform set in the mold. The pressure for the pressing was set at 8 MPa and the time period for the pressing was set for 30 seconds. After the pressing, the pressing pressure was removed, and in a state where a glass molded product obtained by the pressing was in contact with the lower mold member and the upper mold member, the product was gradually cooled to a temperature at which the above glass had a viscosity of $10^{12}$ dPa·s. Then, the glass molded product was rapidly cooled to room temperature and taken out of the mold to give an aspherical lens. In this case, the press stroke was controlled so as not to let any glass enter between the mold members constituting the press mold.

Aspherical lenses obtained in the above manner had remarkably high surface accuracy and their outer circumferential surfaces and outer marginal surfaces of their lens surfaces were surfaces that were usable as positioning reference surfaces.

The aspherical lenses obtained by the precision press-molding were provided with anti-reflection films as required.

INDUSTRIAL UTILITY

The lens of the present invention is a lens formed of a fluorophosphate glass and has an optical-function surface and a positioning reference surface which are transfer surfaces formed by the transfer of form of a molding surface of a mold according to precision press-molding, and it is no longer necessary to process the lens while pressing the optical-function surface. Therefore, damaging of the optical-function surface can be prevented.

The invention claimed is:

1. A lens formed of a fluorophosphate glass having a glass transition temperature of 450° C. or lower and a molar ratio of $F^-$ to the total of $F^-$ and $O^{2-}$, $F^-/(F^-+O^{2-})$ is from 0.25 to 0.85, which lens has an optical-function surface, a positioning reference surface for determining the position of the lens in the optical axis direction in a fixing tool and a positioning reference surface for determining the position perpendicular to the optical axis, both the optical-function surface and the positioning reference surfaces being transfer surfaces formed by the transfer of form of a molding surface of a mold according to precision press-molding.

2. The lens of claim 1, whose entire surfaces are formed of transfer surfaces formed by the transfer of form of the molding surface of the mold according to precision press-molding or formed of said transfer surfaces and a free surface or free surfaces.

3. The lens of claim 1, wherein the fluorophosphate glass contains at least 1 cationic % of $Li^+$ as a cationic component.

4. A lens formed of a fluorophosphate glass, which has an optical-function surface, a positioning reference surface for determining the position of the lens in the optical axis direction in a fixing tool and a positioning reference surface for determining the position perpendicular to the optical axis, both the optical-function surface and the positioning reference surfaces being transfer surfaces formed by the transfer of form of a molding surface of a mold according to precision press-molding;

wherein the fluorophosphate glass comprises $P^{5+}$ and $Al^{3+}$ as essential components, at least two divalent cationic components ($R^{2+}$) selected from $Mg^{2+}$, $Ca^{2+}$, $Sr^{2+}$ and $Ba^{2+}$ and $Li^+$, and containing, by cationic %, 10 to 45% of the $P^{5+}$, 5 to 30% of the $Al^{3+}$, 0 to 20% of the $Mg^{2+}$, 0 to 25% of the $Ca^{2+}$, 0 to 30% of the $Sr^{2+}$, 0 to 33% of the $Ba^{2+}$, 1 to 30% of the $Li^+$, 0 to 10% of $Na^+$, 0 to 10% of $K^+$, 0 to 5% of $Y^{3+}$ and 0 to 15% of $B^{3+}$, wherein the molar ratio of the content of $F^-$ to the total content of $F^-$ and $O^{2-}$, $F^-/(F^-+O^{2-})$, is from 0.25 to 0.85, the fluorophosphate glass has a refractive index (nd) of 1.40 to 1.58 and an Abbe's number (vd) of 67 to 90.

5. The lens of claim 4, whose entire surfaces are formed of transfer surfaces formed by the transfer of form of the molding surface of the mold according to precision press-molding or formed of said transfer surfaces and a free surface or free surfaces.

6. The lens of claim 4, wherein the fluorophosphate glass contains at least 1 cationic % of $Li^+$ as a cationic component.

7. The lens of claim 4, wherein the fluorophosphate glass has a glass transition temperature of 500° C. or lower.

* * * * *